United States Patent
Baek

(10) Patent No.: US 9,917,472 B2
(45) Date of Patent: Mar. 13, 2018

(54) METHOD AND CONTROLLER FOR CONTROLLING SCHEDULED CHARGING OF ELECTRIC VEHICLE

(71) Applicant: Hyundai Motor Company, Seoul (KR)

(72) Inventor: Jong Kil Baek, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 550 days.

(21) Appl. No.: 14/515,046

(22) Filed: Oct. 15, 2014

(65) Prior Publication Data
US 2015/0326050 A1 Nov. 12, 2015

(30) Foreign Application Priority Data
May 8, 2014 (KR) .......... 10-2014-0054555

(51) Int. Cl.
*H02J 7/00* (2006.01)
*H02J 9/00* (2006.01)
*B60L 11/18* (2006.01)

(52) U.S. Cl.
CPC .......... *H02J 9/005* (2013.01); *B60L 11/1816* (2013.01); *B60L 11/1838* (2013.01); *B60L 11/1846* (2013.01); *B60L 11/1861* (2013.01); *H02J 7/0027* (2013.01); *H02J 7/0073* (2013.01); *B60L 2210/30* (2013.01); *B60L 2240/80* (2013.01); *B60L 2250/14* (2013.01); *B60L 2260/58* (2013.01); *Y02T 10/7005* (2013.01); *Y02T 10/705* (2013.01); *Y02T 10/7044* (2013.01); *Y02T 10/7055* (2013.01); *Y02T 10/7072* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .......... B60L 11/1816; B60L 11/1838
USPC .......... 320/109
See application file for complete search history.

(56) References Cited

U.S. PATENT DOCUMENTS

| 2010/0007306 A1* | 1/2010 | Fukui | B60K 6/445 320/107 |
| 2014/0021918 A1* | 1/2014 | Ichikawa | B60L 11/1838 320/109 |
| 2014/0159659 A1* | 6/2014 | Nosaka | B60L 11/1838 320/109 |

FOREIGN PATENT DOCUMENTS

| JP | 2009071899 A | 4/2009 |
| JP | 2010-104114 A | 5/2010 |
| JP | 2010-142026 A | 6/2010 |
| JP | 2011-254644 A | 12/2011 |
| KR | 10-2012-0090677 | 8/2012 |

(Continued)

*Primary Examiner* — David V Henze-Gongola
(74) *Attorney, Agent, or Firm* — Mintz Levin Cohn Ferris Glovsky and Popeo, P.C.; Peter F. Corless

(57) ABSTRACT

A method and controller for controlling scheduled charging of an electric vehicle. A charging start time is scheduled in the electric vehicle. The electric vehicle is connected to a charger by means of a control line. A standby signal is transfers on the control line, and the charger enters into a charging standby mode. A charging control switch of the electric vehicle is then turned on (and subsequently off) for a first time at every first period so that the charger stays in the charging standby mode. At the scheduled charging start time, the charging control switch is turned on and left on so that the charger starts charging the electric vehicle.

12 Claims, 3 Drawing Sheets

(56) References Cited

FOREIGN PATENT DOCUMENTS

| | | |
|---|---|---|
| KR | 10-2013-0078099 | 7/2013 |
| KR | 10-2013-0134119 | 12/2013 |
| WO | 2013/076792 A1 | 5/2013 |

\* cited by examiner

METHOD AND CONTROLLER FOR CONTROLLING SCHEDULED CHARGING OF ELECTRIC VEHICLE

CROSS REFERENCE TO RELATED APPLICATION

The present application claims priority of Korean Patent Application Number 10-2014-0054555 filed on May 8, 2014, the entire contents of which application are incorporated herein for all purposes by this reference.

BACKGROUND OF THE INVENTION

Field of the Invention

The present invention relates to a method and controller for controlling scheduled charging of an electric vehicle such that the electric vehicle can be charged on a schedule using various types of chargers without requiring a redesign of the various types of chargers to do so.

Description of the Related Art

In response to the wide distribution of electric vehicles, charging these electric vehicles has become increasingly important. However, according to the current state of technology, when charging is scheduled in a vehicle or via use of a smartphone or the like, the operation of charging the vehicle according to the schedule sometimes fails. Failure of the scheduled charging is a great inconvenience to a driver. The invention disclosed herein is intended to more reliably ensure that electric vehicles are charged according to the schedule as requested.

The current standards regarding the slow charging of vehicle batteries do not include regulatory standards about scheduled charging. Therefore, at present, scheduled charging is impossible for electric vehicle supply equipment (EVSE) since different control logics of EVSE manufacturers are used.

The information disclosed in the Background of the Invention section is only for the enhancement of understanding of the background or the invention, and should not be taken as an acknowledgment or as any form of suggestion that this information forms a prior art that would already be known to a person skilled in the art.

SUMMARY OF THE INVENTION

Accordingly, the present invention has been made keeping in mind the above problems occurring in the related art, and the present invention is intended to propose a method and a controller for controlling scheduled charging of an electric vehicle such that an electric vehicle can be charged on schedule using various types of chargers without requiring a redesign of the various types of chargers. As such, universal scheduling scheme is provided.

In order to achieve the above object, according to one aspect of the present invention, there is provided a method of controlling scheduled charging of an electric vehicle. In the present invention, a charging start time is scheduled in the electric vehicle and a standby signal is transferred on a control line that connects a charger to the electric vehicle. The charger then enters a charging standby mode in response to the standby signal on the control line and turns on for a preset time and then off a charge control switch in the electric vehicle for a first time at every first period in response to the standby signal on the control line so that the charger continuously stays in the charging standby mode for an extended time. Once the charging start time has is reached, the electric vehicle then turns on the charge control switch so that the charger may start charging the electric vehicle.

In particular, in some exemplary embodiments of the present invention, the standby signal may be a first pulse-width modulation (PWM) signal, a peak of which is as high as a first voltage. Additionally, if turning on the charge control switch for the first time at every first period may include transferring a charging signal on the control line while the charging control switch is on. Like the standby signal, the charging signal may be a second PWM signal, the peak of which is as high as a second voltage. Furthermore, the size of the second voltage may smaller than that of the first signal.

In addition or alternatively, turning on the charge control switch at the charging start time may include turning on a battery charging relay of the electric vehicle after a second time since the turning-on of the charging control switch so that charging is actually carried out. This first time may be shorter than the second time. The charger may determine a failure of charging when the charging standby mode is maintained form third time. This first period may be shorter than the third time.

According to another aspect of the present invention, there is provided a scheduled charging controller of an electric vehicle that is configured to: after a scheduled charging start time is stored, turn on for a preset time and then off a charging control switch of the electric vehicle for a first time at every first period in response to a standby signal being transferred on a control line which connects between the electric vehicle and a charger so that the charger continuously stays on a charging standby mode. The charging control switch may be turned on at a scheduled charging start time so that the charger starts charging the electric vehicle.

According to a further aspect of the present invention, there is provided a method of controlling scheduled charging of an electric vehicle. The method includes the following steps of: when a charging start time is scheduled in the electric vehicle and the electric vehicle may be connected to a charger by means of a control line. A standby signal may then be transferred on the control line and the charger may enter into a charging standby mode. A charging control switch of the electric vehicle is turned on for a preset time and then off for a first time at every first period so that the charger stays in the charging standby mode. When the scheduled charging start time is reached, turning on, at the side of the electric vehicle, the charging control switch so that the charger starts charging the electric vehicle.

According to the method and controller for controlling scheduled charging of an electric vehicle, the electric vehicle can be charged on schedule using various types of chargers without requiring a redesign of the various types of chargers. In addition, even if the scheduled charging is carried out at the electric vehicle instead of at the charger, various types of chargers can properly carry out scheduled charging at a preset time. In particular, even if charger types or standby times are different, scheduled charging can be reliably carried out at the electric vehicle by a relatively simple control method as intended by the user. It is advantageous in that the value of electric vehicles with regard to charging can be improved with substantially no increase in cost.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
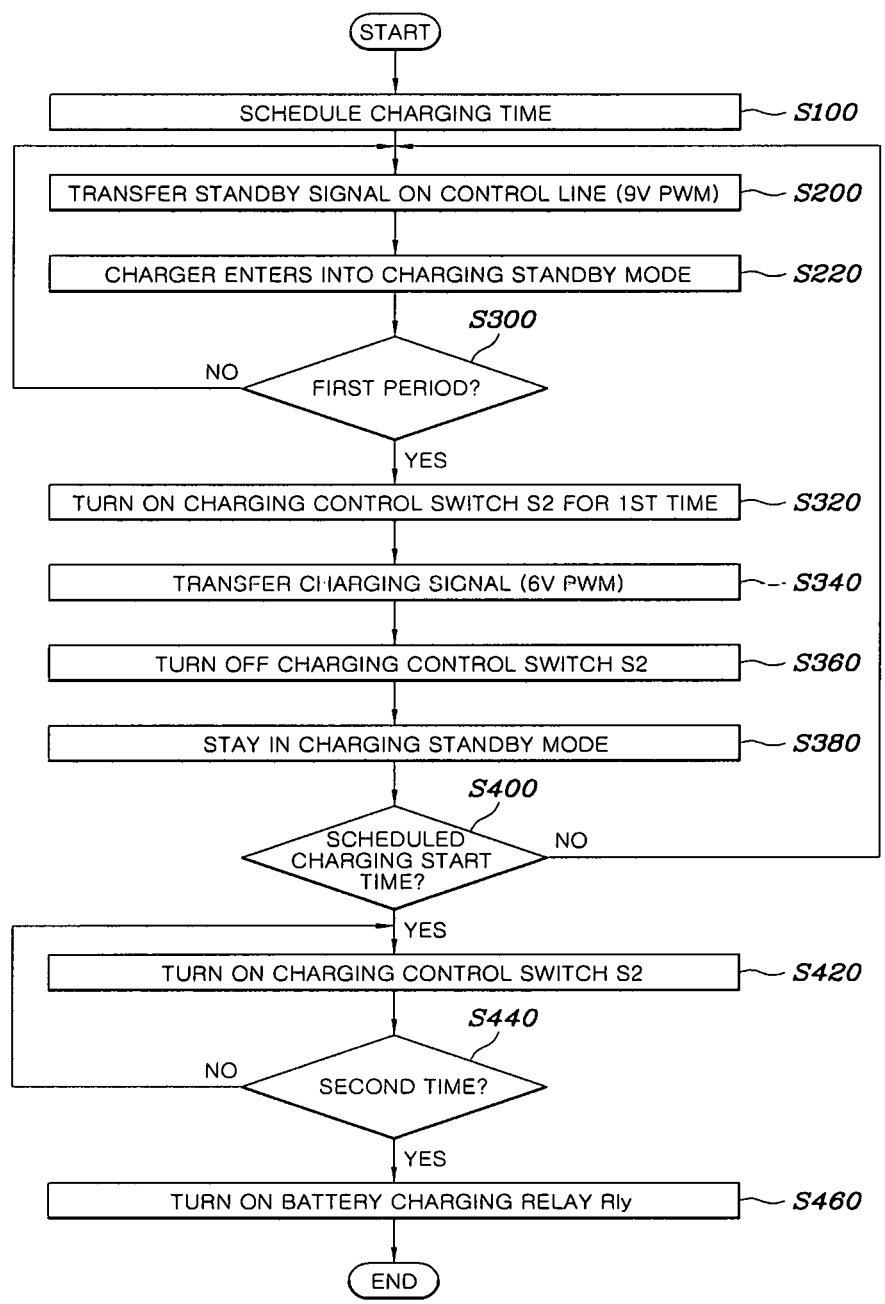
FIG. 1 is a flowchart showing a method of controlling scheduled charging of an electric vehicle according to an exemplary embodiment of the invention.

Reference will now be made in greater detail to an exemplary embodiment of the present invention, an example of which is illustrated in the accompanying drawings. Wherever possible, the same reference numerals will be used throughout the drawings and the description to refer to the same or like parts.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid is electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
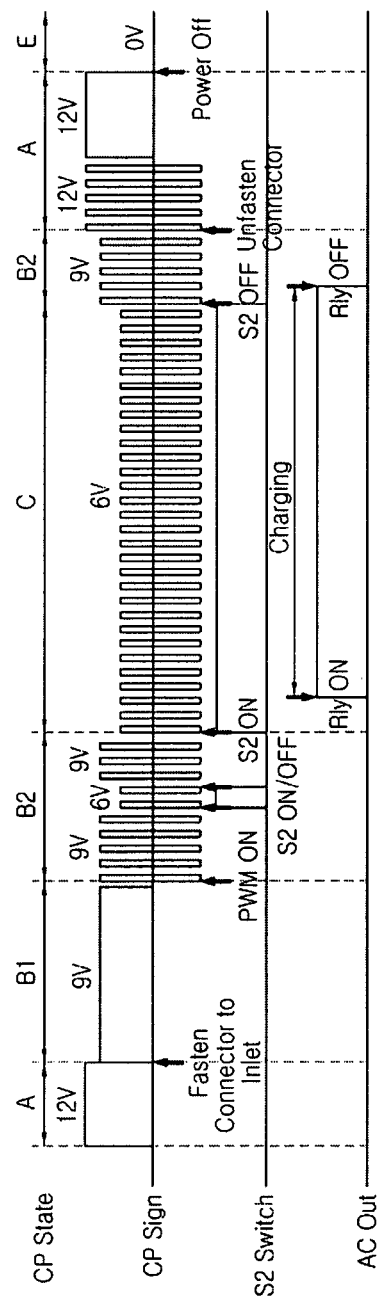
FIG. 2 is a view showing the charging processes of the method of controlling scheduled charging of an electric vehicle according to an exemplary embodiment of the invention.
Figure 3:
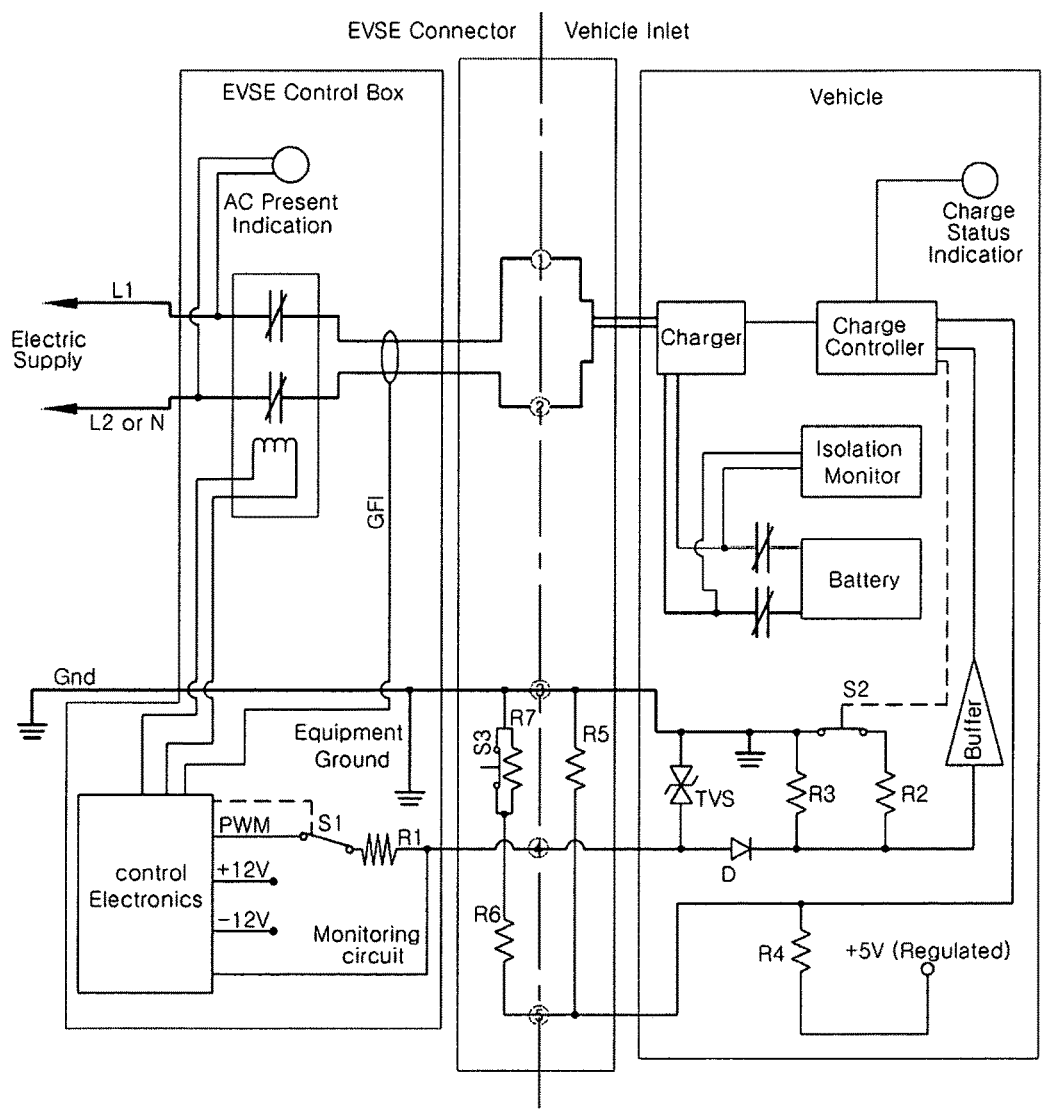
FIG. 3 is a schematic view showing an inter circuitry, a control unit, a charger used for the method of controlling scheduled charging of an electric vehicle according to an exemplary embodiment of the invention.

FIG. 1 is a flowchart showing a method of controlling scheduled charging of an electric vehicle according to an exemplary embodiment of the invention, and FIG. 2 is a view showing the charging processes of the method of controlling scheduled charging of an electric vehicle according to an exemplary embodiment of the invention.

As shown in FIG. 1 and FIG. 2, the method of controlling scheduled charging of an electric vehicle according to this exemplary embodiment. In particular, a scheduling step S100 is executed in which a charging start time in the electric vehicle is scheduled and is then followed by a standby preparation step S200 in which a standby signal is transferred on/sent along a control line or control pilot (CP) that connects a charger to the electric vehicle. Then a standby entrance step S220 is performed in which a charger enters into a charging standby mode in response to receiving the standby signal on the control pilot. In standby extension step S380, a charge control switch is turned on in the electric vehicle for a first time at every first period in response to the standby signal on the control pilot so that the charger can stay in the charging standby mode for an extended time. A charging start step S420 turns on, at the side of the electric vehicle, the charge control switch at the charging start time so that the charger can start charging.

Herein, the charger is an external charger which is disposed, for example, in a charging station or a house.

As shown in FIG. 2, when charging the electric vehicle, the charger is connected to the electric vehicle by means of a connector. The electric vehicle and the charger are connected via the control pilot to communicate with each other. When both sides are ready for charging, a high voltage (e.g., 120 V, 220 V, etc.) is supplied so that charging begins. First, a signal of 12 V flows along the control pilot when the charger is activated. This is detected when the charger is connected to the electric vehicle, and the charger may control a voltage signal on the control pilot to be 9 V.

When the charger is ready for charging, a pulse-width modulation (PWM) signal of 9 V flows along the control pilot. In general, when the 9 V PWM signal is maintained for a preset time or longer, the charger determines it to be in a non-charging state and immediately stops charging.

On the other hand, when a scheduled charging instruction is inputted, the electric vehicle sends no signal to the charger. In particular, the charger cannot receive any signal except for a preset signal, and does not apply a high voltage unless a PWM signal of 6 V flows along the control pilot. When the scheduled charging instruction is inputted to the electric vehicle, the charger does not respond to the instruction.

Therefore, according to the present invention, a 6 V PWM signal intermittently and periodically flows along the control pilot so that the charger maintains its standby state in which the 9 V PWM signal flows. This consequently resets the standby time in the charger so that the charger does not terminate.

Specifically, the sequence of the method of controlling scheduled charging of an electric vehicle according to this exemplary embodiment is shown in FIG. 1. First, the scheduling step S100 of scheduling the charging start time in the electric vehicle is carried out. Since a user will start the electric vehicle at the scheduled time, it must be scheduled such that the charging time will be properly delayed. Afterwards, the standby preparation step S200 of transferring the standby signal on the control pilot that connects the charger to the electric vehicle is carried out. This is indicated by a 9 V PWM signal as in FIG. 2.

After that, the standby entrance step S220 of entering into the charging standby mode at the charger in response to the standby signal on the control pilot is carried out, and then the standby extension step S300, S320, S340 and S380 is carried out. At the standby extension step S300, S320, S340 and S380, the electric vehicle turns on the charge control switch for the first time at every first period in response to the standby signal on the control pilot so that the charger can stay in the charging standby mode for the extended time.

At S400, S420 and S460, when the charging start time is reached, the electric vehicle turns on the charge control switch at the charging start time so that the charger can start charging the electric vehicle. For this, the standby signal can be a first PWM signal, the peak of which is as high as a first voltage, for example, the 9 V PWM signal. At the standby extension step, a charge signal can be sent along the control pilot while the charge control switch of the electric vehicle is turned on. The charge signal can be a second PWM signal, the peak of which is as high as a second voltage, for example, the 6 V PWM signal. In addition, the standby signal is the first PWM signal, the peak of which is as high as the first voltage, and the size of the second signal can be smaller than that of the first signal.

At the charging start step S420, when the charging start time is reached, the electric vehicle turns on the charging control switch so that the charger can start charging the electric vehicle. A battery charging relay of the electric vehicle is turned on after a second time since the turning-on of the charging control switch so that actual charging can be carried out. The first time can be shorter than the second time. If the charging standby mode is maintained for a third time, the charger determines that the charging has failed. In some exemplary embodiments of the present invention, the first period occurs before the third time is reached.

Describing with reference to FIG. 1 and FIG. 2, when the 9 V PWM signal flows as the first PWM signal along the control pilot, the charger enters into the charging standby mode at S220. When the charging standby mode is maintained for a third time, the charger determines an error has occurred and enters into a charging end mode. In order to prevent this, the electric vehicle is required to turn on the charging control switch S3 for a preset period of time at least before the elapse of the third time so that the charger resets the charging standby time at S320, S340 and S360. Therefore, the first period where the electric vehicle turns on the charging control switch S3 must be shorter than the third time.

In addition, the first time during which the electric vehicle turns on the charging control switch S3 should be very short. Since the battery charging relay Rly of the electric vehicle is turned on after the second time since the turning-on of the charging control switch S3, the charging control switch S3 is turned on for the first time (i.e., which is a short period of time). Therefore, the first time is required to be shorter than the second time (S320, S340, S360).

With this configuration, after the charger has entered into the standby mode, the electric vehicle sends a charging signal for a short time before the charger enters into the end mode so that the charger can stay in the standby mode. Since the charging signal is sent for a short time directly before actual starting of the charging operation, it is possible to prevent the battery from being unnecessarily charged and accurately maintain the start time of the scheduled charging.

In addition, after the scheduled charging start time is stored, the scheduled charging controller of the electric vehicle according to the present invention turns on the charging control switch of the electric vehicle for the first time at every first period in response to the standby signal being transferred on the control pilot which connects between the electric vehicle and the charger so that the charger can continuously stay in the charging standby mode. At the scheduled charging start time, the scheduled charging controller of the electric vehicle turns on the charging control switch so that the charger can start charging the battery of the electric vehicle.

As such, according to the method and controller for controlling scheduled charging of an electric vehicle as set forth above, scheduled charging is enabled for all types of chargers without having to redesign of the chargers and allowing all charges to be universally controlled for scheduling. Even if the scheduled charging is carried out at the side of the electric vehicle instead of at the charger side, various types of chargers can properly carry out scheduled charging at a preset time. In particular, even if charger types or standby times are different, scheduled charging can be reliably carried out at the side of the electric vehicle by a relatively simple control method as intended by the user. It is advantageous in that the value of electric vehicles with regard to charging can be improved with substantially no increase in cost.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A method of controlling scheduled charging of an electric vehicle, the method comprising:
    scheduling a charging start time in the electric vehicle;
    sending a standby signal on a control line that connects a charger to the electric vehicle;
    in response to the standby signal being transferred on the control line:
        entering into a charging standby mode at the charger, and
        turning on for a preset time and then off a charge control switch in the electric vehicle for a first time at every first period so that the charger continuously stays in the charging standby mode for an extended time; and
    once the charging start time has been reached, turning on and leaving on the charge control switch in the electric vehicle so that the charger starts charging the electric vehicle by electrically connecting the vehicle and the charger.

2. The method according to claim 1, wherein the standby signal comprises a first pulse-width modulation signal, a peak of which is as high as a first voltage.

3. The method according to claim 1, wherein turning on and off the charge control switch for the first time at every first period comprises transferring a charging signal on the control line while the charging control switch is on.

4. The method according to claim 3, wherein the charging signal comprises a second pulse-width modulation signal, a peak of which is as high as a second voltage.

5. The method according to claim 4, wherein the standby signal comprises a first pulse-width modulation signal, a peak of which is as high as a first voltage, and a size of the second voltage is smaller than that of the first signal.

6. The method according to claim 1, wherein turning on the charge control switch at the charging start time comprises transferring a charging signal on the control line while the charge control switch of the electric vehicle is on.

7. The method according to claim 6, wherein the charging signal comprises a second pulse-width modulation signal, a peak of which is as high as a second voltage.

8. The method according to claim 1, wherein turning on the charge control switch at the charging start time comprises turning on a battery charging relay of the electric vehicle after a second time since the turning-on of the charging control switch so that charging is actually carried out by connecting the battery.

9. The method according to claim 8, wherein the first time is shorter than the second time.

10. The method according to claim 1, wherein the charger determines a failure of charging when the charging standby mode is maintained for a third time, the first period being shorter than the third time.

11. A scheduled charging controller of an electric vehicle configured to:
    after a scheduled charging start time is stored, turn on for a preset time and then off a charging control switch of the electric vehicle for a first time at every first period in response to a standby signal being transferred on a control line which connects between the electric vehicle and a charger so that the charger continuously stays on a charging standby mode; and turn on and leaving on the charging control switch at the scheduled charging start time so that the charger starts charging the electric vehicle.

12. A method of controlling scheduled charging of an electric vehicle, the method comprising:

when a charging start time is scheduled in the electric vehicle and the electric vehicle is connected to a charger by means of a control line,
transferring a standby signal on the control line,
entering into a charging standby mode at the charger, and
turning on for a preset time and then off a charging control switch of the electric vehicle for a first time at every first period so that the charger stays in the charging standby mode; and when the scheduled charging start time is reached, turning on and leaving on, the charging control switch so that the charger starts charging the electric vehicle.

* * * * *